United States Patent [19]

Pastor et al.

[11] Patent Number: 5,069,701
[45] Date of Patent: Dec. 3, 1991

[54] PREPARATION OF FLUORIDE GLASS BY CHEMICAL VAPOR DEPOSITION

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 488,374

[22] Filed: Feb. 23, 1990

Related U.S. Application Data

[63] Continuation of Ser. No. 107,740, Jul. 13, 1987, abandoned.

[51] Int. Cl.⁵ ............................................. C03B 37/016
[52] U.S. Cl. .................................... 65/18.2; 65/60.7; 65/DIG. 16; 423/489; 427/255.3
[58] Field of Search ......... 65/3.12, 33, 18.2, DIG. 16, 65/60.7; 501/40; 423/489, 492, 497, 496; 427/255.3

[56] References Cited

U.S. PATENT DOCUMENTS

| | | | |
|---|---|---|---|
| 4,040,807 | 8/1977 | Midwinter | 65/3.13 |
| 4,092,466 | 5/1978 | Fletcher et al. | 526/261 |
| 4,162,908 | 7/1979 | Rau et al. | 65/DIG. 16 X |
| 4,263,030 | 4/1981 | Kobayashi et al. | 65/DIG. 16 X |
| 4,264,347 | 4/1981 | Shintani et al. | 65/DIG. 16 X |
| 4,378,987 | 4/1983 | Miller et al. | 65/3.12 |
| 4,493,721 | 1/1985 | Auwerda et al. | 65/3.12 |
| 4,501,602 | 2/1985 | Miller et al. | 65/18.2 |
| 4,645,524 | 2/1987 | Bocko et al. | 65/3.12 X |
| 4,708,726 | 11/1987 | Miller et al. | 65/18.2 |
| 4,718,929 | 1/1988 | Power et al. | 65/3.12 |
| 4,752,454 | 6/1988 | Pastor et al. | 423/19 |

FOREIGN PATENT DOCUMENTS

| | | | |
|---|---|---|---|
| 57-175743 | 10/1982 | Japan | 65/DIG. 16 |
| 7051146 | 9/1990 | Japan | 501/40 |
| 1530337 | 10/1978 | United Kingdom | 427/255.3 |

*Primary Examiner*—Kenneth M. Schor
*Assistant Examiner*—John Hoffman
*Attorney, Agent, or Firm*—Paul M. Coble; W. K. Denson-Low

[57] ABSTRACT

A fluoride glass is prepared by depositing a solid including a metal fluoride on a heated substrate, from a gaseous mixture of a nonmetallo-organic compound, carbon dioxide, and a source of carbonyl fluoride. The nonmetallo-organic compound contains the metallic cation of the metal fluoride bonded to an organic species through an electronegative element such as oxygen, but not directly to a carbon atom. The carbon dioxide, or optionally another species reactive with carbon to produce a gas, oxidizes solid carbon and other reduction products of the organic compound that could otherwise be present in the deposited metal fluoride to impair optical properties of the fluoride glass. The carbonyl fluoride, supplied by the gas itself or by reactants that produce the gas, reacts with the nonmetallo-organic compound without producing water, which would otherwise degrade the glass purity.

13 Claims, 1 Drawing Sheet

PREPARATION OF FLUORIDE GLASS BY CHEMICAL VAPOR DEPOSITION

This is a continuation of application Ser. No. 107,740, filed Oct. 13, 1987, now abandoned.

BACKGROUND OF THE INVENTION

This invention relates to the preparation of fluoride glass, and, more particularly, to the preparation of fluoride glass by chemical vapor deposition.

As commonly used, the term "glass" refers to materials that are transparent to radiation such as visible light, so that they permit radiation energy to pass or conduct the radiation, but prevent passage of matter. The radiation is ordinarily thought of as being visible light, but can also include those forms of radiation that are not visible to the human eye. For example, infrared energy, having a wavelength greater than that of visible light, is not visible to the human eye. Infrared light includes electromagnetic radiation having wavelengths of from about 0.8 to about 8 micrometers, and sometimes beyond. Infrared light is used in a variety of devices, including fiber optic communications systems, detectors, photocells, vidicons, and the like. It is therefore important to have glasses that are good optical conductors for use with infrared radiation.

Windows for visible light, such as those commonly found in the home, are made of silicon dioxide based glasses. These glasses are readily prepared and are highly transmissive to visible light having wavelengths of from about 0.3 to about 0.7 micrometers, and to certain other forms of electromagnetic radiation. However, the silicon dioxide glasses have much poorer transmission of infrared energy, and generally cannot be used as windows for infrared energy.

The metal fluoride glasses are known to have good transmission to infrared radiation, and have been successfully tested for use in infrared systems. The production and use of metal fluoride glass pose some difficult challenges. Special care must be taken during production of the glass to prevent harmful or dangerous fluoride reactions, and to avoid degradation of the glass in use. Metal fluoride glasses are conventionally prepared by melting a mix of the necessary fluoride components, and quenching the melt to a supercooled state to form the glass. Precautions are taken to avoid undersired reactions.

Glasses to be used as the conductor portion of optical waveguides and related devices are often prepared by depositing the chemical mixture of the glass on the inside of a glass tube. The deposited material is converted to the vitreous state, and then the tube is drawn to a fine filament, so that the deposited glass becomes a light-conducting core that is enclosed within the outer glass case of the material originally forming the glass tube. The casing confines transmitted light to the central core as a result of the difference in the values of the refractive indices of the casing and the core.

This technology is well established for silicon dioxide and similar types of core glass used in conducting visible light. In one approach, called chemical vapor deposition or CVD, two or more selected gases containing the volatilized individual ingredients of the glass are passed into the interior of a heated glass outer tube, with the result that the gases react to deposit the glass-forming ingredients on the inside surface of the tube, in a form known as glass soot. The glass tube and glass soot are heated to melt the soot, further heated to collapse the tube, and cooled to convert the glass soot to the vitreous state. This collapsed tube, termed a preform, is then drawn to a fine size using glass drawing techniques.

The result of this process is a composite glass structure, having a continuous central glass optical conductor or waveguide that conducts the light, lying along the center axis of an outer protective glass covering. Chemical vapor deposition provides an excellent method for forming such glass composites with one type of glass in the center of a tube of another type of glass.

The key to using chemical vapor deposition is to find reactant compounds of the required glass forming elements that can be made sufficiently volatile, and which do not leave unintended residues mixed with the deposited glassy materials. Such compounds and techniques are well established for oxide glasses such as silicon dioxide glasses. No practical combination of compounds and techniques is as yet known for depositing metal fluoride glasses, so that chemical vapor deposition of metal fluoride glasses to be used in infrared waveguides, for example, is not practiced commercially.

There is therefore a need for a chemical vapor deposition process for depositing metal fluoride glasses. Such a process should be operable to produce such glasses, be economically and commercially practical, and not involve excessively hazardous or dangerous reactant gases that cannot readily be handled. The present invention fulfills this need, and further provides related advantages.

SUMMARY OF THE INVENTION

The present invention provides a process for preparing metal fluoride glasses by chemical vapor deposition (CVD). The method uses relatively nontoxic and controllable reactive gases. Particulate and chemical impurities in the metal fluoride glass, which can adversely affect the optical properties of the glass, are avoided. The process is compatible with existing CVD procedures, including those used to deposit the glass on a substrate such as the interior wall of a tube.

In accordance with the invention, a process for preparing a fluoride glass having at least one metallic cation, comprises the steps of furnishing a heated substrate, and contacting to the substrate a mixture of a nonmetallo-organic compound containing the metallic cation in a form not bonded directly to a carbon atom, an oxidizing species reactive with carbon to produce a gas, and a source of carbonyl fluoride, whereupon a solid containing a metal fluoride is deposited on the substrate.

The process of the present invention is conducted by chemical vapor deposition, wherein a mixture of reactive gases is passed over a heated substrate. When heated at the surface of the substrate, the gases in the mixture react with each other to form a solid substance deposited onto the surface of the substrate. Unreacted gases and gaseous reaction products are carried away from the surface of the substrate and out of the system.

In the present process, the deposited solid substance contains metallic cations such as, by way of example and not limitation, cadmium, barium, zirconium, aluminum, and zinc. One of the principal challenges of chemical vapor deposition used to deposit metallic ions is identifying and supplying a compound that incorporates the metallic ion into the molecular structure with a sufficiently strong bond to serve as a medium for transfer of the metal ion, but in a manner that the metal ion can be deposited upon the surface when the compound is reacted. Additionally, the metal-containing compound must exhibit a reasonably high vapor pressure, so that it can be volatilized into the gas stream, upstream of the heated substrate.

One class of compounds widely used to transfer metallic cations in chemical vapor deposition is the metallo-organic compounds, wherein a metallic cation is bonded to a carbon atom in an organic anion. Many of these compounds have the necessary range of vapor pressures so that chemical vapor deposition is possible. However, a significant drawback of most metallo-organic compounds is their high toxicity and excessive reactivity that often can be explosive under typical laboratory and commercial circumstances. These problems persist when the glass to be deposited is a fluoride glass, as the mixture of a gaseous fluoride and a metallo-organic compound is toxic and highly reactive due to the presence of the latter.

The present invention avoids the problems with using metallo-organic compounds by furnishing the metallic cation in an organic compound wherein the cation is not bonded to a carbon atom, but instead is bonded to the anion through an electronegative element such as oxygen, sulfur, or nitrogen. These compounds have been termed nonmetallo-organic compounds. In these compounds, the bonding is more covalent than ionic. The metallic cation is typically attached to the organic anion at two points of attachment (termed a bidentate structure) or more. With this constraint, the cation is somewhat sequestered. The nonmetallo-organic compounds are less toxic and less subject to explosive reaction than are the traditional metallo-organic compounds. Operable nonmetallo-organic compounds include beta diketonates such as acetylacetonates, hexafluoroacetylacetonates, and alkoxides such as ethoxides and iso-propoxides.

Examples of bidentate nonmetallo-organic compounds include aceto-acetic ester and acetylacetone compounds with a metal, where the metallic cation is attached to the organic anion through oxygen, and alpha-amino acids, where the metallic cation is attached to the organic anion at least partially through nitrogen, and their derivatives. An example of a quadridentate nonmetallo-organic compound is the calcium chelate of ethylenediamine tetracetate, wherein the calcium cation is attached to the anion through two nitrogen and two oxygen atoms.

The volatility of metal-acetylacetonate and its derivatives, such as hexafluoroacetylacetonate, is well known, and provides the necessarily good volatility for use in chemical vapor deposition processes. There are techniques for increasing volatility, if it is not inherently sufficient. The volatility of the molecule generally increases with an increase in the number of attachment points for the cation and consequent increase in the degree of sequestering. The volatility may be further enhanced by coordinating further the cation with a bulky solvent which presents a nonpolar exterior, such as tetrahydrofuran.

There is a significant problem, however, associated with the use of the nonmetallo-organic compounds. The nonmetallo-organic compounds should be sufficiently volatile at the source to produce an acceptably high cation content in the gas stream, thereby giving the deposition process a high efficiency. On the other hand, the organic residue desirably does not fragment at the heated substrate, as such fragmentation can deposit contaminants such as carbon onto the substrate, which then become contaminants in the final glass that can impair its optical performance. Such decomposition of nonmetallo-organic compounds can and does occur at the heated surface of the deposition substrate, but the present approach provides a process modification that negates the harmful effects of the decomposition.

Specifically, when reacted with a source of fluoride such as hydrogen fluoride gas at the substrate surface, the corresponding nonmetallo-organic compound is displaced to produce the solid metal fluoride. The organic product often readily decomposes in the gaseous mixture to various product gases and solids that contaminate the deposited compounds at the substrate.

More specifically, the compounds displaced as a reaction product of nonmetallo-organic salts and hydrogen fluoride typically decompose spontaneously at the elevated temperature of the substrate to produce water vapor and carbon monoxide, carbon dioxide, and solid carbon, as well as other gases or solids, at or adjacent to the heated substrate. Water vapor is highly undersirable, as it degrades the anion purity through hydrolysis. Solid carbon is deposited onto the growing substrate, as well as other surfaces in the chemical vapor deposition reactor, as minute particles. These particles remain in the final metal fluoride glass, resulting in optical scattering centers that reduce the transmission of light in the glass.

According to the present invention, the presence of water vapor and solid carbon in and adjacent to the deposited product of the chemical vapor deposition reaction can be reduced and avoided by including specific reactant gases in the gaseous mixture supplied to the reactor and reacted at the heated substrate. Water vapor is eliminated by using carbonyl fluoride, $COF_2$, as the source of the flourine. The reaction products are typically the deposited metal fluoride, hydrogen fluoride gas, carbon monoxide gas, carbon tetrafluoride, and solid carbon. The water vapor is therefore not present, but carbon remains a problem if only the carbonyl fluoride is used.

The appearance of small particles of solid carbon in the deposited metal fluoride is avoided by including in the reactant gas mixture an oxidizing species that reacts with the carbon to produce a gas. Carbon dioxide is preferred, so that the carbon dioxide oxidizes and burns off any incipient solid carbon and any solid carbon that actually forms.

The present invention therefore calls for the reactant gas mixture for chemical vapor deposition to contain a nonmetallo-organic compound, a species reactive with carbon to produce a gas, preferably carbon dioxide, and a source of carbonyl fluoride. Carbonyl fluoride itself is such a source, but has the drawback of being an expensive gas. Fortunately, it can be supplied in other ways. For example, carbonyl fluoride can be produce by reacting carbon dioxide with carbon tetrafluoride, which itself can be formed by decomposing TEFLON, a trademark for poly(tetrafluorethylene).

In accordance with a preferred aspect of the invention, a process for preparing a fluoride glass having at least one metallic cation comprises the steps of furnishing a heated substrate, and contacting to the substrate a mixture of a nonmetallo-organic compound containing the metallic cation in a form not bonded directly to a carbon atom, carbon dioxide, and a source of carbonyl fluoride selected from the group consisting of carbonyl fluoride, carbon tetrafluoride, and poly(tetrafluoroethylene).

It will be appreciated that the present approach provides an important advance in the art of producing metal fluoride glasses having particular utility in infrared transmission applications. Nontoxic, nonexplosive nonmetallo-organic compounds are volatilized and decomposed to provide the necessary cations. The particular combination of other reactive gases avoids production of water vapor and solid carbon, thereby permitting the nonmetallo-organic compound to be used to prepare a high quality metal fluoride glass. Other features and advantages of the present invention will be apparent from the following more detailed description, taken in conjunction with the accompanying drawing, which illustrates, by way of example, the principles of the invention.

DETAILED DESCRIPTION OF THE PREFERRED EMBODIMENT

Figure 1:
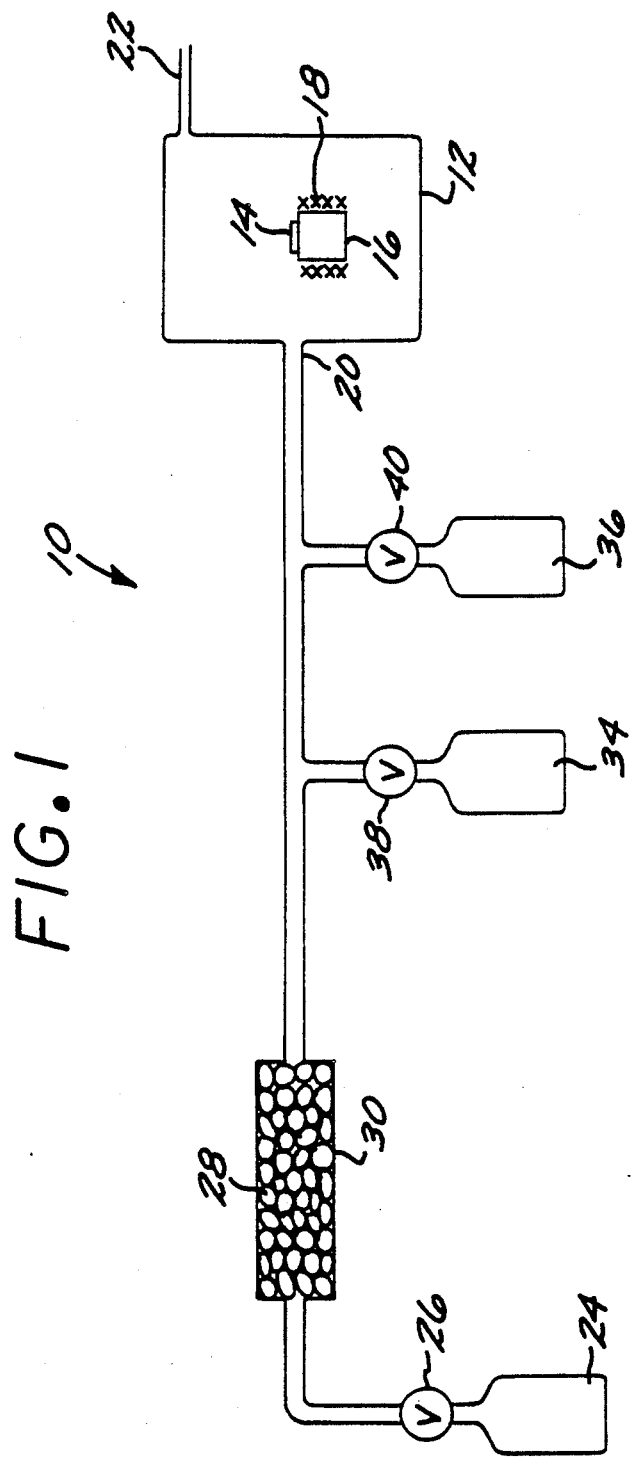
FIG. 1 is a schematic side view of an apparatus for chemical vapor deposition of a fluoride glass.

The chemical vapor deposition approach of the present invention is used in conjunction with a chemical vapor deposition (CVD) apparatus 10 of the type illustrated in FIG. 1. (Other configurations of CVD apparatus can also be used, for specific applications.) The apparatus 10 includes a reaction chamber 12 having therein a substrate 14 supported on a base 16. The base 16 is heated by a resistance heating coil 18 wrapped thereupon, and the substrate 14 is heated by conduction of heat from the base 16. Heating can also be accomplished by induction heating, if desired. Reaction gases are introduced into the chamber 12 through an entrance port 20. Unreacted portions of the reaction gases and gaseous reaction products are removed through an exit port 22 to gas processing and cleanup facilities, not shown.

The reaction gases are provided to the reaction chamber 12 in a flowing gas stream. The gases are selected according to the principles discussed herein. Apparatus for providing the preferred mixture of four gases is illustrated in FIG. 1, although the use of more or fewer gases is possible. A carrier gas source 24 of a carrier gas such as argon provides a flow of the carrier gas through a regulator valve 26. The vapor of the nonmetallo-organic compound is most easily introduced into the carrier gas stream by flowing the carrier gas through the nonmetallo-organic (NMO) compound 28 contained in an NMO source 30.

The carbon dioxide and carbonyl fluoride gases are provided directly as gases, from a carbon dioxide source 34 and a carbonyl fluoride source 36. (As indicated previously, the carbonyl fluoride can also be synthesized from other chemical sources.) The flows of these gases are regulated through a carbon dioxide valve 38 and a carbonyl fluoride valve 40, respectively. The composition of the resulting gas mixture can thereby be controlled to provide an amount sufficient for the reaction, and consistent with the volatility of the nonmetallo-organic compound. The mole fractions, partial pressures, and flow rates of the constituents of the gas stream are as needed, and there are, at this time, no known limitations on these values.

In operation of the apparatus 10, the gas stream entering the chamber 12 is first established, to achieve the desired gaseous atmosphere for the CVD reaction. The heating coil is then activated, and the base and substrate are brought to the operating temperature. The reaction that deposits the fluoride glass precursor or soot begins and continues as long as the reaction conditions are maintained.

The metal fluoride layer deposited upon the substrate 14 by this or another process is typically of a particulate character. The term "glass" is herein used to described the metal fluoride layer 48 both before and after the consolidation treatment to be described hereinafter, although it is understood that the as-deposited layer may contain little or no actual glassy material. The metal fluoride layer contains the chemical constituents of the metal fluoride glass, and is either a glass or a physical precursor of the glass. The metal fluoride layer is consolidated into a fully glassy material, one having no long range ordering of the atoms and thence no crystallographic arrangement, by compaction and heating as necessary, and then cooling to the vitreous state.

The selected chemical composition of the metal fluoride glass will depend upon the needs of the particular system, and can be achieved by providing particular nonmetallo-organic compositions as the compound 28. In the presently preferred approach, a barium fluoride glass of composition about $BaF_2$ is prepared by supplying barium acetylacetonate, $(CH_3COCH_2CO_2)_2Ba$, as the nonmetallo-organic compound 28; carbon dioxide, $CO_2$, in the source 34; and carbonyl fluoride, $COF_2$, in the source 36. The three reactive gases are introduced into the carrier gas in the manner previously discussed.

It will be recognized that the present approach achieves the deposition of metal fluoride glasses that would be difficult or impossible by other techniques. Physical vapor deposition of fluoride glasses is unlikely because of the low vapor pressures of the highly ionic fluorides. Chemical vapor deposition of fluoride glasses from sources other than organic compounds is likewise difficult or impossible, due to the low vapor pressures of the fluorides. By contrast, the vapor pressures of sources of components for oxide glasses are generally much more volatile, so that oxide glasses can be made by such approaches. Use of the nonmetallo-organic gas and selected reactive gases in the reactive mixture of the present invention avoids the toxicity and explosion problems inherent in the use of metallo-organics used in other chemical vapor deposition systems.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing a fluoride glass having at least one metallic cation, comprising the steps of:
   furnishing a heated substrate;
   contacting to the substrate a mixture of a metallo-organic compound in which a metallic cation is bonded to a carbon atom through an electronegative atom selected from the group consisting of oxygen, nitrogen, and sulfur, sufficient amount of an oxidizing species reactive with carbon to convert substantially all carbon in the mixture to carbon monoxide, and carbonyl fluoride produced by a reaction of a reaction mixture selected from the group consisting of a mixture of carbon dioxide and carbon tetrafluoride and a mixture of carbon dioxide and decomposed poly(tetrafluoroethylene), whereupon through the action of the carbonyl fluoride the metallo-organic compound is decomposed to yield a solid containing a metal fluoride deposited on the substrate; and consolidating said solid to a fully glassy material.

2. The process of claim 1, wherein the metallic cation is selected from the group consisting of barium, cadmium, zirconium, aluminum, and zinc.

3. The process of claim 1, wherein the organic portion of the metallo-organic compound is selected from the group consisting of a beta diketonate, a hexafluoroacetylacetonate, and an alkoxide.

4. The process of claim 1, wherein the organic portion of the metallo-organic compound is the beta diketonate acetylacetonate.

5. The process of claim 1, wherein the organic portion of the metallo-organic compound is an alkoxide selected from the group consisting of an ethoxide and an iso-propoxide.

6. The process of claim 1, wherein the first named mixtured further includes a carrier gas that is inert in respect to the deposition reaction.

7. A process for preparing a fluoride glass having at least one metallic cation, comprising the steps of:

furnishing a heated substrate;

contacting to the substrate a mixture of a metallo-organic compound containing the metallic cation bonded to a carbon atom through an electronegative atom selected from the group consisting of oxygen, nitrogen and sulfur, sufficient carbon dioxide to convert substantially all carbon in the mixture to carbon monoxide, carbonyl fluoride produced by a reaction of a reaction mixture selected from the group consisting of a mixture of carbon dioxide and carbon tetrafluoride and a mixture of carbon dioxide and decomposed poly(tetrafluorethylene), whereupon through the action of the carbonyl fluoride the metallo-organic compound is decomposed to yield a solid containing metal fluoride on the substrate; and consolidating said solid to a fully glassy material.

8. The process of claim 7, wherein the metallic cation is selected from the group consisting of barium, cadmium, zirconium, aluminum, and zinc.

9. The process of claim 7, wherein the organic portion of the metallo-organic compound is selected from the group consisting of a beta diketonate, a hexafluoroacetylacetonate, and an alkoxide.

10. The process of claim 7, wherein the organic portion of the metallo-organic compound is the beta diketonate acetylacetonate.

11. The process of claim 7, wherein the organic portion of the metallo-organic compound is an alkoxide selected from the group consisting of an ethoxide and an iso-propoxide.

12. The process of claim 7, wherein the first named mixture contains an inert carrier gas.

13. A process for preparing a barium fluoride glass comprising the steps of:

furnishing a heated substrate;

contacting to the substrate a mixture of a metallo-organic compound in which barium cation is bonded to a carbon atom through an electronegative atom selected from the group consisting of oxygen, nitrogen and from the group consisting of oxygen, nitrogen and sulfur, sufficient carbon dioxide to convert substantially all carbon in the mixture to carbon monoxide, carbonyl fluoride produced by a reaction of a reaction mixture selected from the group consisting of a mixture of carbon dioxide and carbon tetrafluoride and a mixture of carbon dioxide and decomposed poly(tetrafluorethylene), whereupon through the action of the carbonyl fluoride the metallo-organic compound is decomposed to yield a solid containing barium fluoride on the substrate; and consolidating said solid to a fully glassy material.

* * * * *

UNITED STATES PATENT AND TRADEMARK OFFICE
CERTIFICATE OF CORRECTION

PATENT NO. : 5,069,701
DATED : December 3, 1991
INVENTOR(S) : Ricardo C. Pastor, et al It is certified that error appears in the above-indentified patent and that said Letters Patent is hereby corrected as shown below:

Col. 7, line 24, delete "mixtured" and insert --mixture--.

Signed and Sealed this

Twelfth Day of October, 1993

Attest:

BRUCE LEHMAN

*Attesting Officer*     *Commissioner of Patents and Trademarks*